(12) United States Patent
Moriyama et al.

(10) Patent No.: US 6,857,718 B2
(45) Date of Patent: Feb. 22, 2005

(54) PRINTING APPARATUS, INFORMATION PROCESSING APPARATUS, CONTROL METHOD FOR THEM, AND PROGRAM

(75) Inventors: Jiro Moriyama, Kanagawa (JP); Hidehiko Kanda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 10/411,189

(22) Filed: Apr. 11, 2003

(65) Prior Publication Data

US 2003/0193532 A1 Oct. 16, 2003

(30) Foreign Application Priority Data

Apr. 15, 2002 (JP) .......................... 2002-112655

(51) Int. Cl.[7] .............................. B41J 29/38
(52) U.S. Cl. ..................... 347/14; 358/1.17; 358/1.6
(58) Field of Search .................. 347/5, 14; 358/1.15, 358/1.16, 1.17, 1.6, 1.9

(56) References Cited

U.S. PATENT DOCUMENTS

| | | | | |
|---|---|---|---|---|
| 4,313,124 A | | 1/1982 | Hara ........................... | 347/57 |
| 4,345,262 A | | 8/1982 | Shirato et al. ................ | 347/10 |
| 4,459,600 A | | 7/1984 | Sato et al. .................... | 347/47 |
| 4,463,359 A | | 7/1984 | Ayata et al. ................... | 347/56 |
| 4,558,333 A | | 12/1985 | Sugitani et al. .............. | 347/65 |
| 4,723,129 A | | 2/1988 | Endo et al. .................... | 347/56 |
| 4,740,796 A | | 4/1988 | Endo et al. .................... | 347/56 |
| 5,173,717 A | | 12/1992 | Kishida et al. ............... | 347/13 |
| 5,550,954 A | * | 8/1996 | Campbell et al. ............ | 358/1.6 |
| 5,610,638 A | * | 3/1997 | Courtney ...................... | 347/14 |
| 5,825,993 A | * | 10/1998 | Shimura et al. ............. | 358/1.16 |
| 5,920,681 A | * | 7/1999 | Hori ............................. | 358/1.5 |
| 5,923,820 A | * | 7/1999 | Cunnagin et al. ............ | 358/1.8 |
| 5,971,518 A | | 10/1999 | Bolash et al. ................. | 347/13 |
| 6,097,499 A | | 8/2000 | Casey et al. ................. | 358/1.16 |
| 6,120,129 A | | 9/2000 | Iwasaki et al. ............... | 347/43 |
| 6,128,098 A | | 10/2000 | Kamada et al. .............. | 358/1.8 |
| 6,158,836 A | | 12/2000 | Iwasaki et al. ............... | 347/15 |
| 6,247,786 B1 | * | 6/2001 | Booth et al. .................. | 347/40 |
| 6,264,305 B1 | | 7/2001 | Inui et al. ..................... | 347/40 |
| 6,313,922 B1 | * | 11/2001 | Jackson ..................... | 358/1.16 |
| 6,612,674 B1 | * | 9/2003 | Holtzman et al. ............ | 347/14 |

FOREIGN PATENT DOCUMENTS

| | | | |
|---|---|---|---|
| EP | 0 916 495 | 5/1999 | |
| EP | 0 917 093 | 5/1999 | |
| EP | 1120253 A1 * | 8/2001 | .............. B41J/2/01 |
| JP | 58-146929 | 9/1983 | |
| JP | 59-123670 | 7/1984 | |
| JP | 59-138461 | 8/1984 | |
| JP | 10-278318 | 10/1998 | |
| JP | 11-227181 | 8/1999 | |
| JP | 11-259248 | 9/1999 | |

OTHER PUBLICATIONS

U.S. Appl. No. 10/281,183, Moriyama et al., filed Oct. 28, 2002.

U.S. Appl. No. 10/411,111, Moriyama et al., filed Apr. 11, 2003.

U.S. Appl. No. 10/411,298, Kanda et al., filed Apr. 11, 2003.

(List continued on next page.)

*Primary Examiner*—Lamson Nguyen
*Assistant Examiner*—Blaise Mouttet
(74) *Attorney, Agent, or Firm*—Fitzpatrick, Cella, Harper & Scinto

(57) ABSTRACT

A printing apparatus receives block size information of a block which is generated on the basis of the performance of a host apparatus for a print buffer for storing print data of each block and serves as a storage unit in the print buffer. Print data generated based on the performance of the host apparatus for each block corresponding to the received block size information is stored in the print buffer. The CPU in the printing apparatus controls printing by the printhead on the basis of the print data stored in the print buffer.

21 Claims, 6 Drawing Sheets

OTHER PUBLICATIONS

U.S. Appl. No. 10/411,527, Moriyama et al., filed Apr. 11, 2003.

U.S. Appl. No. 10/413,144, Nakayama et al., filed Apr. 15, 2003.

U.S. Appl. No. 10/413,146, Tanaka et al., filed Apr. 15, 2003.

U.S. Appl. No. 10/413,485, Kuronuma et al., filed Apr. 15, 2003.

* cited by examiner

PRINTING APPARATUS, INFORMATION PROCESSING APPARATUS, CONTROL METHOD FOR THEM, AND PROGRAM

FIELD OF THE INVENTION

The present invention relates to a printing apparatus and printing method and, particularly, to a technique of implementing a low-cost, high-speed, high-quality printing apparatus. More particularly, the present invention relates to an inkjet printing apparatus and control method therefor which maintain a high speed or high image quality while reducing the RAM capacity or ROM capacity in the printing apparatus or the number of gates of an ASIC to implement a low-cost printing apparatus. The present invention also relates to an inkjet printing apparatus and control method therefor which perform printing proper for the relationship between the host apparatus of a system and the printing apparatus.

BACKGROUND OF THE INVENTION

Inkjet printing systems have widely been used in printing apparatuses, copying machines, and the like because low noise, low apparatus cost, low running cost, compact apparatus size, and the like can be facilitated.

A conventional serial inkjet printing apparatus prints one page by repeating main scanning of a printhead in the main scanning direction and sub-scanning of a printing medium in the sub-scanning direction. The serial inkjet printing apparatus ensures a memory (print buffer) having a capacity sufficient to store print data of at least one scanning. After all print data of one scanning is stored in the print buffer, main scanning of the printhead starts. Especially with the development of color printing apparatuses and an increase in resolution in response to demands for higher image qualities, the capacity necessary for the print buffer increases. The printing apparatus requires an expensive, larger-capacity memory, resulting in a high apparatus cost.

To solve the conventional problem, Japanese Patent Laid-Open No. 58-146929 discloses a technique of constituting a memory whose capacity is smaller than a capacity for storing print data of one scanning, managing print data by a storage address, and efficiently exploiting the small-capacity memory.

Japanese Patent Laid-Open No. 11-227181 discloses a technique of reducing a memory capacity for storing print data by transmitting print data corresponding to a nozzle for use from a host apparatus to a printing apparatus by using a printhead having a plurality of nozzles in the sub-scanning direction and using a printing apparatus whish repeats main scanning and sub-scanning to form an image.

Japanese Patent Laid-Open No. 11-259248 discloses a technique of achieving reduction in memory capacity and high-speed printing by starting main scanning of a printhead before the completion of storing print data of one main scanning in a memory. This proposal assumes that data sufficient to complete scanning is always received during scanning/printing while main scanning of the printhead is executed. Thus, the memory capacity cannot be greatly reduced.

Japanese Patent Laid-Open No. 10-278318 discloses a technique of efficiently using the nozzle of a printhead by using a set of nozzles which change in number depending on the capacity of the buffer memory of a printing apparatus, the power amount, or the ink flow rate of the printhead.

However, no proposal considers the type of host apparatus connected to the printing apparatus or the connection environment with the host apparatus. Effects realized by each proposal cannot be satisfactorily achieved depending on the type of host apparatus or the connection environment with the host apparatus.

SUMMARY OF THE INVENTION

The present invention has been made to overcome the conventional drawbacks, and has as its object to provide a printing apparatus which can implement a low-cost, compact printing apparatus without degrading the original performance of the apparatus and can realize printing under optimal printing conditions based on an information processing apparatus for generating print data, an information processing apparatus, a control method for the printing apparatus and information processing apparatus, and a program.

According to the present invention, the foregoing object is attained by providing a printing apparatus which performs printing by driving a printhead on the basis of print data transmitted from a host apparatus, comprising:

main scanning means for scanning the printhead in a main scanning direction with respect to a printing medium;

buffer means for storing print data of each block;

reception means for receiving block size information of a block which is generated on the basis of performance of the host apparatus and serves as a storage unit in the buffer means;

storage means for storing print data generated on the basis of the performance of the host apparatus in the buffer means for each block corresponding to the block size information received by the reception means; and control means for controlling printing by the printhead on the basis of the print data stored in the buffer means.

In a preferred embodiment, the storage means stores print data of each block during scanning of the printhead by the main scanning means, and a data amount which can be stored in the buffer means is smaller than a print data amount corresponding to a region printable by one main scanning of the printhead.

In a preferred embodiment, the print data generated on the basis of the performance of the host apparatus includes print data corresponding to the number of orifices used for one main scanning of the printhead.

In a preferred embodiment, the performance of the host apparatus includes at least one or a combination of a type of CPU of the host apparatus, a clock frequency of the CPU, a main memory capacity, a CPU occupation ratio to control of the printing apparatus, a type of OS, and an interface or a data transfer rate between the host apparatus and the printing apparatus.

In a preferred embodiment, the reception means receives, from the host apparatus, main scanning/printing speed information for controlling a printing speed of the printhead in the main scanning direction, and the control means controls printing by the printhead on the basis of the main scanning/printing speed information and the print data stored in the buffer means.

According to the present invention, the foregoing is attained by providing a printing apparatus which performs printing by driving a printhead on the basis of print data transmitted from a host apparatus, comprising:

main scanning means for scanning the printhead in a main scanning direction with respect to a printing medium;

buffer means for storing print data of each block;

storage means for storing print data generated by the host apparatus in the buffer means;

reception means for receiving main scanning/printing speed information which is generated on the basis of performance of the host apparatus and controls a printing speed of the printhead in the main scanning direction; and control means for controlling printing by the printhead on the basis of the main scanning/printing speed information and the print data stored in the buffer means.

In a preferred embodiment, the storage means stores print data of each block during scanning of the printhead by the main scanning means, and a data amount which can be stored in the buffer means is smaller than a print data amount corresponding to a region printable by one main scanning of the printhead.

In a preferred embodiment, the performance of the host apparatus includes at least one or a combination of a type of CPU of the host apparatus, a clock frequency of the CPU, a main memory capacity, a CPU occupation ratio to control of the printing apparatus, a type of OS, and an interface or a data transfer rate between the host apparatus and the printing apparatus.

In a preferred embodiment, when a data transfer rate of print data transferred from the host apparatus decreases and the reception means receives new main scanning/printing speed information representing the decrease in data transfer rate, the control means decreases the printing speed of the printhead in the main scanning direction on the basis of the new main scanning/printing speed information.

According to the present invention, the foregoing object is attained by providing a printing apparatus which performs printing by driving a printhead on the basis of print data transmitted from a host apparatus, comprising:

main scanning means for scanning the printhead in a main scanning direction with respect to a printing medium;

buffer means for storing print data of each block;

reception means for receiving block size information of a block which is generated on the basis of a printing mode set by the host apparatus and serves as a storage unit in the buffer means;

storage means for storing print data generated on the basis of the printing mode set by the host apparatus in the buffer means for each block corresponding to the block size information received by the reception means; and control means for controlling printing by the printhead on the basis of the print data stored in the buffer means.

In a preferred embodiment, the storage means stores print data of each block during scanning of the printhead by the main scanning means, and a data amount which can be stored in the buffer means is smaller than a print data amount corresponding to a region printable by one main scanning of the printhead.

In a preferred embodiment, the print data generated on the basis of the printing mode set by the host apparatus includes print data corresponding to the number of orifices used for one main scanning of the printhead.

According to the present invention, the foregoing object is attained by providing a printing apparatus which performs printing by driving a printhead on the basis of print data transmitted from a host apparatus, comprising:

main scanning means for scanning the printhead in a main scanning direction with respect to a printing medium;

buffer means for storing print data of each block;

storage means for storing print data generated by the host apparatus in the buffer means;

reception means for receiving main scanning/printing speed information which is generated on the basis of a printing mode set by the host apparatus and controls a printing speed of the printhead in the main scanning direction; and control means for controlling printing by the printhead on the basis of the main scanning/printing speed information and the print data stored in the buffer means.

In a preferred embodiment, the storage means stores print data of each block during scanning of the printhead by the main scanning means, and a data amount which can be stored in the buffer means is smaller than a print data amount corresponding to a region printable by one main scanning of the printhead.

According to the present invention, the foregoing object is attained by providing an information processing apparatus which transmits print data to a printing apparatus that has a buffer for storing print data of each block and performs printing by scanning a printhead in a main scanning direction with respect to a printing medium on the basis of the print data stored in the buffer, comprising:

first transmission means for generating block size information of a block serving as a storage unit in the buffer on the basis of performance of the information processing apparatus, and transmitting the block size information to the printing apparatus;

generation means for generating print data on the basis of the performance of the information processing apparatus; and second transmission means for transmitting the print data generated by the generation means to the printing apparatus.

In a preferred embodiment, the print data generated by the generation means includes print data which is determined in accordance with the performance of the information processing apparatus and corresponds to the number of orifices used for one main scanning of the printhead.

In a preferred embodiment, the performance includes at least one or a combination of a type of CPU of the information processing apparatus, a clock frequency of the CPU, a main memory capacity, a CPU occupation ratio to control of the printing apparatus, a type of OS, and an interface or a data transfer rate between the information processing apparatus and the printing apparatus.

According to the present invention, the foregoing object is attained by providing an information processing apparatus which transmits print data to a printing apparatus that has a buffer for storing print data of each block and performs printing by scanning a printhead in a main scanning direction with respect to a printing medium on the basis of the print data stored in the buffer, comprising:

first transmission means for generating main scanning/printing speed information for controlling a printing speed of the printhead in the main scanning direction on the basis of performance of the information processing apparatus, and transmitting the main scanning/printing speed information to the printing apparatus;

generation means for generating print data; and second transmission means for transmitting the print data generated by the generation means to the printing apparatus.

In a preferred embodiment, the performance includes at least one or a combination of a type of CPU of the information processing apparatus, a clock frequency of the CPU, a main memory capacity, a CPU occupation ratio to control of the printing apparatus, a type of OS, and an interface or a data transfer rate between the information processing apparatus and the printing apparatus.

According to the present invention, the foregoing object is attained by providing an information processing apparatus which transmits print data to a printing apparatus that has a buffer for storing print data of each block and performs printing by scanning a printhead in a main scanning direction with respect to a printing medium on the basis of the print data stored in the buffer, comprising:

first transmission means for generating block size information of a block serving as a storage unit in the buffer on the basis of a printing mode of the printing apparatus set by the information processing apparatus, and transmitting the block size information to the printing apparatus;

generation means for generating print data on the basis of the printing mode of the printing apparatus set by the information processing apparatus; and second transmission means for transmitting the print data generated by the generation means to the printing apparatus.

In a preferred embodiment, the print data generated by the generation means includes print data which is determined in accordance with the printing mode of the printing apparatus and corresponds to the number of orifices used for one main scanning of the printhead.

According to the present invention, the foregoing object is attained by providing an information processing apparatus which transmits print data to a printing apparatus that has a buffer for storing print data of each block and performs printing by scanning a printhead in a main scanning direction with respect to a printing medium on the basis of the print data stored in the buffer, comprising:

first transmission means for generating main scanning/printing speed information for controlling a printing speed of the printhead in the main scanning direction on the basis of a printing mode of the printing apparatus set by the information processing apparatus, and transmitting the main scanning/printing speed information to the printing apparatus;

generation means for generating print data; and second transmission means for transmitting the print data generated by the generation means to the printing apparatus.

According to the present invention, the foregoing object is attained by providing a method of controlling a printing apparatus which has a buffer for storing print data of each block and performs printing by driving a printhead on the basis of print data from a host apparatus that is stored in the,buffer, comprising:

a reception step of receiving block size information of a block which is generated on the basis of performance of the host apparatus and serves as a storage unit in the buffer;

a storage step of storing print data generated on the basis of the performance of the host apparatus in the buffer for each block corresponding to the block size information received in the reception step; and a control step of controlling printing by the printhead on the basis of the print data stored in the buffer.

According to the present invention, the foregoing object is attained by providing a method of controlling a printing apparatus which has a buffer for storing print data of each block and performs printing by driving a printhead on the basis of print data from a host apparatus that is stored in the buffer, comprising:

a storage step of storing print data generated by the host apparatus in the buffer;

a reception step of receiving main scanning/printing speed information which is generated on the basis of performance of the host apparatus and controls a printing speed of the printhead in a main scanning direction; and a control step of controlling printing by the printhead on the basis of the main scanning/printing speed information and the print data stored in the buffer.

According to the present invention, the foregoing object is attained by providing a method of controlling a printing apparatus which has a buffer for storing print data of each block and performs printing by driving a printhead on the basis of print data from a host apparatus that is stored in the buffer, comprising:

a reception step of receiving block size information of a block which is generated on the basis of a printing mode of the host apparatus and serves as a storage unit in the buffer;

a storage step of storing print data generated on the basis of the printing mode set by the host apparatus in the buffer for each block corresponding to the block size information received in the reception step; and a control step of controlling printing by the printhead on the basis of the print data stored in the buffer.

According to the present invention, the foregoing object is attained by providing a method of controlling a printing apparatus which has a buffer for storing print data of each block and performs printing by driving a printhead on the basis of print data from a host apparatus that is stored in the buffer, comprising:

a storage step of storing print data generated by the host apparatus in the buffer;

a reception step of receiving main scanning/printing speed information which is generated on the basis of a printing mode set by the host apparatus and controls a printing speed of the printhead in a main scanning direction; and a control step of controlling printing by the printhead on the basis of the main scanning/printing speed information and the print data stored in the buffer.

According to the present invention, the foregoing object is attained by providing a method of controlling an information processing apparatus which transmits print data to a printing apparatus that has a buffer for storing print data of each block and performs printing by scanning a printhead in a main scanning direction with respect to a printing medium on the basis of the print data stored in the buffer, comprising:

a first transmission step of generating block size information of a block serving as a storage unit in the buffer on the basis of performance of the information processing apparatus, and transmitting the block size information to the printing apparatus;

a generation step of generating print data on the basis of the performance of the information processing apparatus; and a second transmission step of transmitting the print data generated in the generation step to the printing apparatus.

According to the present invention, the foregoing object is attained by providing a method of controlling an information processing apparatus which transmits print data to a printing apparatus that has a buffer for storing print data of each block and performs printing by scanning a printhead in a main scanning direction with respect to a printing medium on the basis of the print data stored in the buffer, comprising:

a first transmission step of generating main scanning/printing speed information for controlling a printing speed of the printhead in the main scanning direction on the basis of performance of the information processing apparatus, and transmitting the main scanning/printing speed information to the printing apparatus;

a generation step of generating print data; and a second transmission step of transmitting the print data generated in the generation step to the printing apparatus.

According to the present invention, the foregoing object is attained by providing a method of controlling an information processing apparatus which transmits print data to a printing apparatus that has a buffer for storing print data of each block and performs printing by scanning a printhead in a main scanning direction with respect to a printing medium on the basis of the print data stored in the buffer, comprising:

a first transmission step of generating block size information of a block serving as a storage unit in the buffer on the basis of a printing mode of the printing apparatus set by the information processing apparatus, and transmitting the block size information to the printing apparatus;

a generation step of generating print data on the basis of the printing mode of the printing apparatus set by the information processing apparatus; and a second transmission step of transmitting the print data generated in the generation step to the printing apparatus.

According to the present invention, the foregoing object is attained by providing a method of controlling an information processing apparatus which transmits print data to a printing apparatus that has a buffer for storing print data of each block and performs printing by scanning a printhead in a main scanning direction with respect to a printing medium on the basis of the print data stored in the buffer, comprising:

a first transmission step of generating main scanning/printing speed information for controlling a printing speed of the printhead in the main scanning direction on the basis of a printing mode of the printing apparatus set by the information processing apparatus, and transmitting the main scanning/printing speed information to the printing apparatus;

a generation step of generating print data; and a second transmission step of transmitting the print data generated in the generation step to the printing apparatus.

According to the present invention, the foregoing object is attained by providing a program of causing a computer to control a printing apparatus which has a buffer for storing print data of each block and performs printing by driving a printhead on the basis of print data from a host apparatus that is stored in the buffer, comprising:

a program code for a reception step of receiving block size information of a block which is generated on the basis of performance of the host apparatus and serves as a storage unit in the buffer;

a program code for a storage step of storing print data generated on the basis of the performance of the host apparatus in the buffer for each block corresponding to the block size information received in the reception step; and a program code for a control step of controlling printing by the printhead on the basis of the print data stored in the buffer.

According to the present invention, the foregoing object is attained by providing a program of causing a computer to control a printing apparatus which has a buffer for storing print data of each block and performs printing by driving a printhead on the basis of print data from a host apparatus that is stored in the buffer, comprising:

a program code for a storage step of storing print data generated by the host apparatus in the buffer;

a program code for a reception step of receiving main scanning/printing speed information which is generated on the basis of performance of the host apparatus and controls a printing speed of the printhead in a main scanning direction; and a program code for a control step of controlling printing by the printhead on the basis of the main scanning/printing speed information and the print data stored in the buffer.

According to the present invention, the foregoing object is attained by providing a program of causing a computer to control a printing apparatus which has a buffer for storing print data of each block and performs printing by driving a printhead on the basis of print data from a host apparatus that is stored in the buffer, comprising:

a program code for a reception step of receiving block size information of a block which is generated on the basis of a printing mode of the host apparatus and serves as a storage unit in the buffer;

a program code for a storage step of storing print data generated on the basis of the printing mode set by the host apparatus in the buffer for each block corresponding to the block size information received in the reception step; and a program code for a control step of controlling printing by the printhead on the basis of the print data stored in the buffer.

According to the present invention, the foregoing object is attained by providing a program of causing a computer to control a printing apparatus which has a buffer for storing print data of each block and performs printing by driving a printhead on the basis of print data from a host apparatus that is stored in the buffer, comprising:

a program code for a storage step of storing print data generated by the host apparatus in the buffer;

a program code for a reception step of receiving main scanning/printing speed information which is generated on the basis of a printing mode set by the host apparatus and controls a printing speed of the printhead in a main scanning direction; and a program code for a control step of controlling printing by the printhead on the basis of the main scanning/printing speed information and the print data stored in the buffer.

According to the present invention, the foregoing object is attained by providing a program of causing a computer to control an information processing apparatus which transmits print data to a printing apparatus that has a buffer for storing print data of each block and performs printing by scanning a printhead in a main scanning direction with respect to a printing medium on the basis of the print data stored in the buffer, comprising:

a program code for a first transmission step of generating block size information of a block serving as a storage unit in the buffer on the basis of performance of the information processing apparatus, and transmitting the block size information to the printing apparatus;

a program code for a generation step of generating print data on the basis of the performance of the information processing apparatus; and a program code for a second transmission step of transmitting the print data generated in the generation step to the printing apparatus.

According to the present invention, the foregoing object is attained by providing a program of causing a computer to control an information processing apparatus which transmits print data to a printing apparatus that has a buffer for storing print data of each block and performs printing by scanning a printhead in a main scanning direction with respect to a printing medium on the basis of the print data stored in the buffer, comprising:

a program code for a first transmission step of generating main scanning/printing speed information for controlling a printing speed of the printhead in the main scanning direction on the basis of performance of the information processing apparatus, and transmitting the main scanning/printing speed information to the printing apparatus;

a program code for a generation step of generating print data; and a program code for a second transmission step of transmitting the print data generated in the generation step to the printing apparatus.

According to the present invention, the foregoing object is attained by providing a program of causing a computer to control an information processing apparatus which transmits print data to a printing apparatus that has a buffer for storing print data of each block and performs printing by scanning a printhead in a main scanning direction with respect to a printing medium on the basis of the print data stored in the buffer, comprising:

a program code for a first transmission step of generating block size information of a block serving as a storage unit in the buffer on the basis of a printing mode of the printing apparatus set by the information processing apparatus, and transmitting the block size information to the printing apparatus;

a program code for a generation step of generating print data on the basis of the printing mode of the printing apparatus set by the information processing apparatus; and a program code for a second transmission step of transmitting the print data generated in the generation step to the printing apparatus.

According to the present invention, the foregoing object is attained by providing a program of causing a computer to control an information processing apparatus which transmits print data to a printing apparatus that has a buffer for storing print data of each block and performs printing by scanning a printhead in a main scanning direction with respect to a printing medium on the basis of the print data stored in the buffer, comprising:

a program code for a first transmission step of generating main scanning/printing speed information for controlling a printing speed of the printhead in the main scanning direction on the basis of a printing mode of the printing apparatus set by the information processing apparatus, and transmitting the main scanning/printing speed information to the printing apparatus;

a program code for a generation step of generating print data; and a program code for a second transmission step of transmitting the print data generated in the generation step to the printing apparatus.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be described in detail below with reference to the accompanying drawings.

(First Embodiment)

Figure 1:
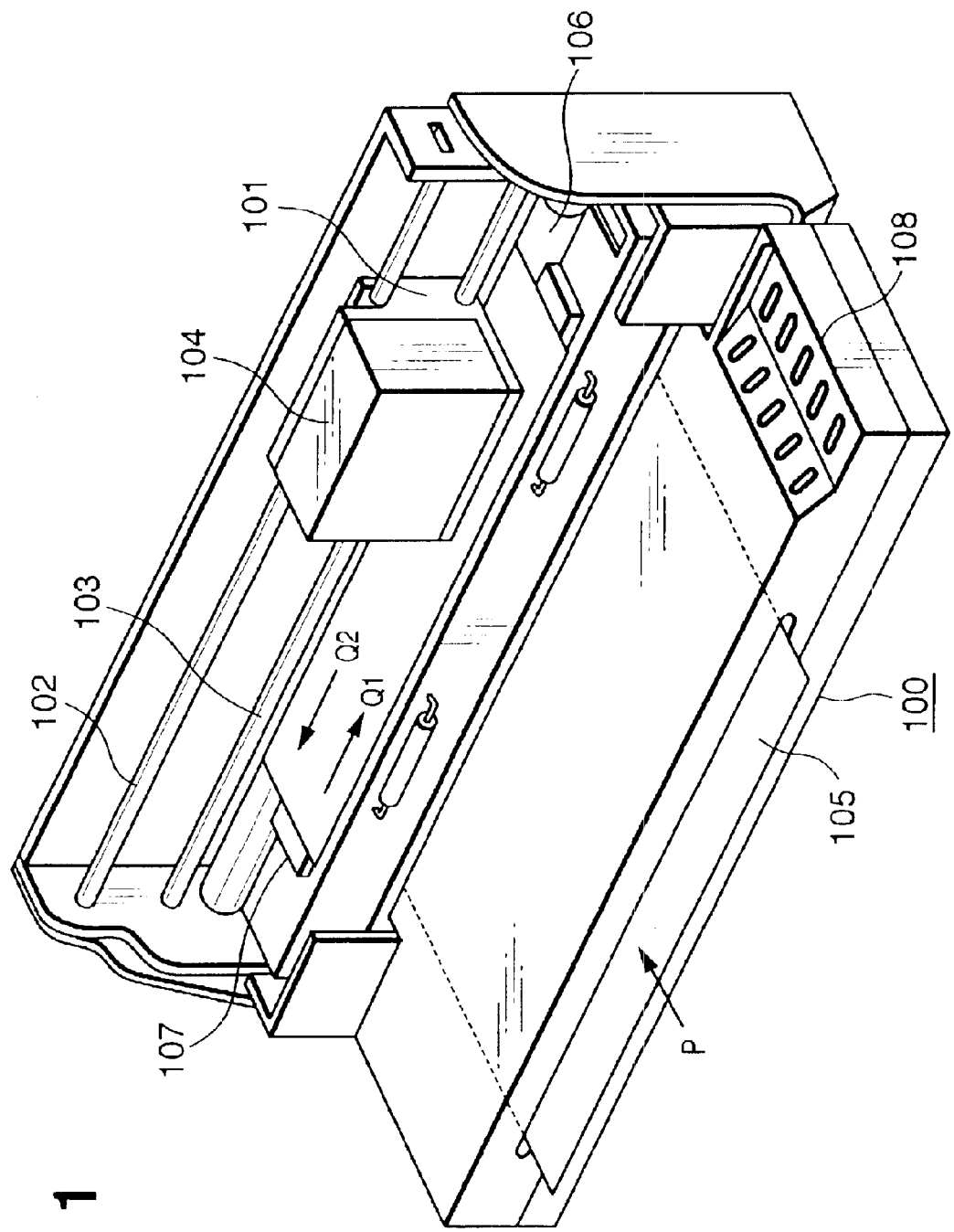
FIG. 1 is a perspective view showing the schematic arrangement of an inkjet printing apparatus to which the present invention can be applied.

FIG. 1 is a perspective view showing the schematic arrangement of an inkjet printing apparatus to which the present invention can be applied.

The inkjet printer (printing apparatus 100) can perform both color printing and monochrome printing. For a monochrome printing apparatus, the printhead is equipped with only nozzles for discharging black ink (to be described later).

A printing medium 105 inserted into the sheet feed position of the printing apparatus 100 is fed by a feed roller 106 in a direction indicated by an arrow P, and conveyed to the printable region of a printhead 104. A platen 107 is arranged below the printing medium 105 in the printable region. A carriage 101 can be moved along two guide shafts 102 and 103. The carriage 101 is reciprocally scanned by driving of a stepping motor (not shown) within a scanning region including a printing region in directions indicated by arrows Q1 and Q2, which represent main scanning directions. After one main scanning ends, the printing medium is fed by a predetermined amount in the sub-scanning direction indicated by the arrow P, and the next main scanning is awaited. Main scanning and sub-scanning are repeated to perform a printing operation of one page.

As for a printing width in the main scanning direction, a region where the printhead 104 can be mechanically scanned is determined by the apparatus design. The maximum printing width is determined depending on the apparatus in correspondence with the scanning region. Printing can be done for a printing medium 105 having a printing width determined by the scanning region of the printhead 104 or a printing medium 105 having a smaller printing width in the printing apparatus 100.

In FIG. 1, the printhead 104 mounted on the carriage 101 includes orifices (printing elements) capable of discharging ink, and an ink tank which contains ink. The printhead 104 is mounted on the carriage 101 such that printing is done by discharging ink from the orifice of the printhead 104 to the printing medium 105 below it.

Reference numeral 108 denotes an operation panel including switches and a display. The switches are used to power on/off the printing apparatus 100 or set various printing modes. The display can display various statuses of the printing apparatus 100.

The printhead 104 can print data in four colors: yellow (Y), magenta (M), cyan (C), and black (Bk). The number of orifices for each of Y, M, and C is 128, and the number of orifices for Bk is 320. The layout pitch between orifices for each color is 1/600 inch in the sub-scanning direction, which corresponds to about 42 μm. The driving frequency of the printhead 104 is generally 15 kHz, and the printhead 104 can perform printing operation at a density of 600 dpi in the main scanning direction. The main scanning speed of the carriage 101 in printing operation is generally 25 inch/sec.

A linear encoder (not shown) with a slit at a cycle of 600 dpi is arranged on the back side of the carriage 101. A mechanical controller 404 (FIG. 3) operates the carriage motor of a mechanical unit 405, reciprocating the carriage 101 in the main scanning direction (directions indicated by Q1 and Q2 in FIG. 1).

The carriage motor which drives the carriage 101 is, e.g., a DC motor. In general printing operation, the position or moving speed of the carriage 101 is detected by an optical sensor on the back side of the carriage 101 by using the linear encoder. The scanning speed of the carriage 101 is kept constant under DC servo control.

The orifice layout of the printhead 104 will be explained with reference to FIG. 2.

Figure 2:
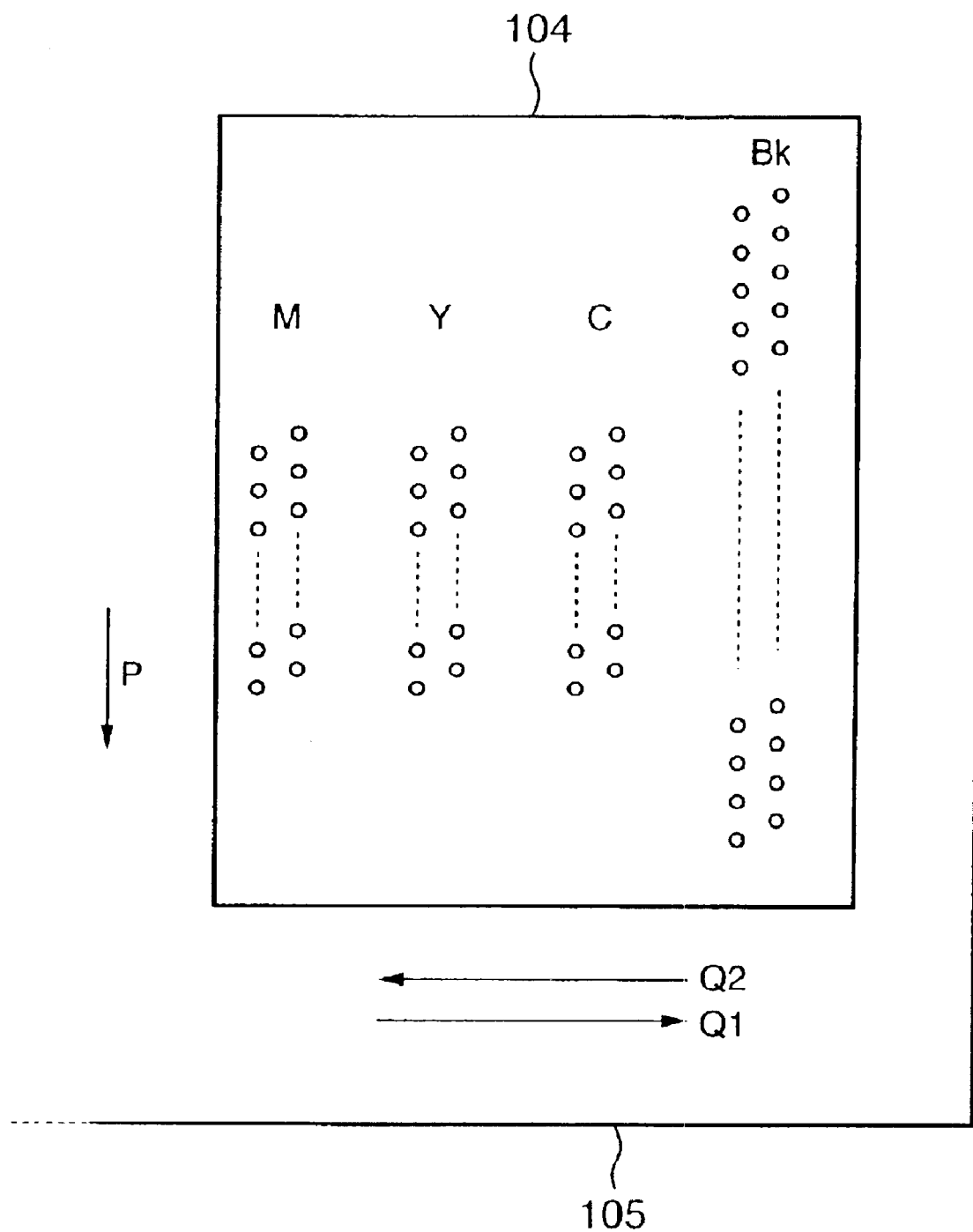
FIG. 2 is a view showing the orifice layout of a printhead according to the first embodiment.

FIG. 2 is a view showing the orifice layout of the printhead according to the first embodiment.

As described above, the printhead 104 has orifices for discharging a plurality of color inks of yellow (Y), magenta (M), cyan (C), and black (K). In practice, orifices for each color are arrayed in two lines, and the layout pitch between the lines is 1/300 inch. The printhead 104 moves in the main scanning directions indicated by the arrows Q1 and Q2 with respect to the printing medium 105. The printing medium 105 is relatively moved in the direction indicated by the arrow P with respect to the printhead 104.

The main arrangement of a printing system comprised of the printing apparatus 100 and a host apparatus will be explained with reference to FIG. 3.

Figure 3:
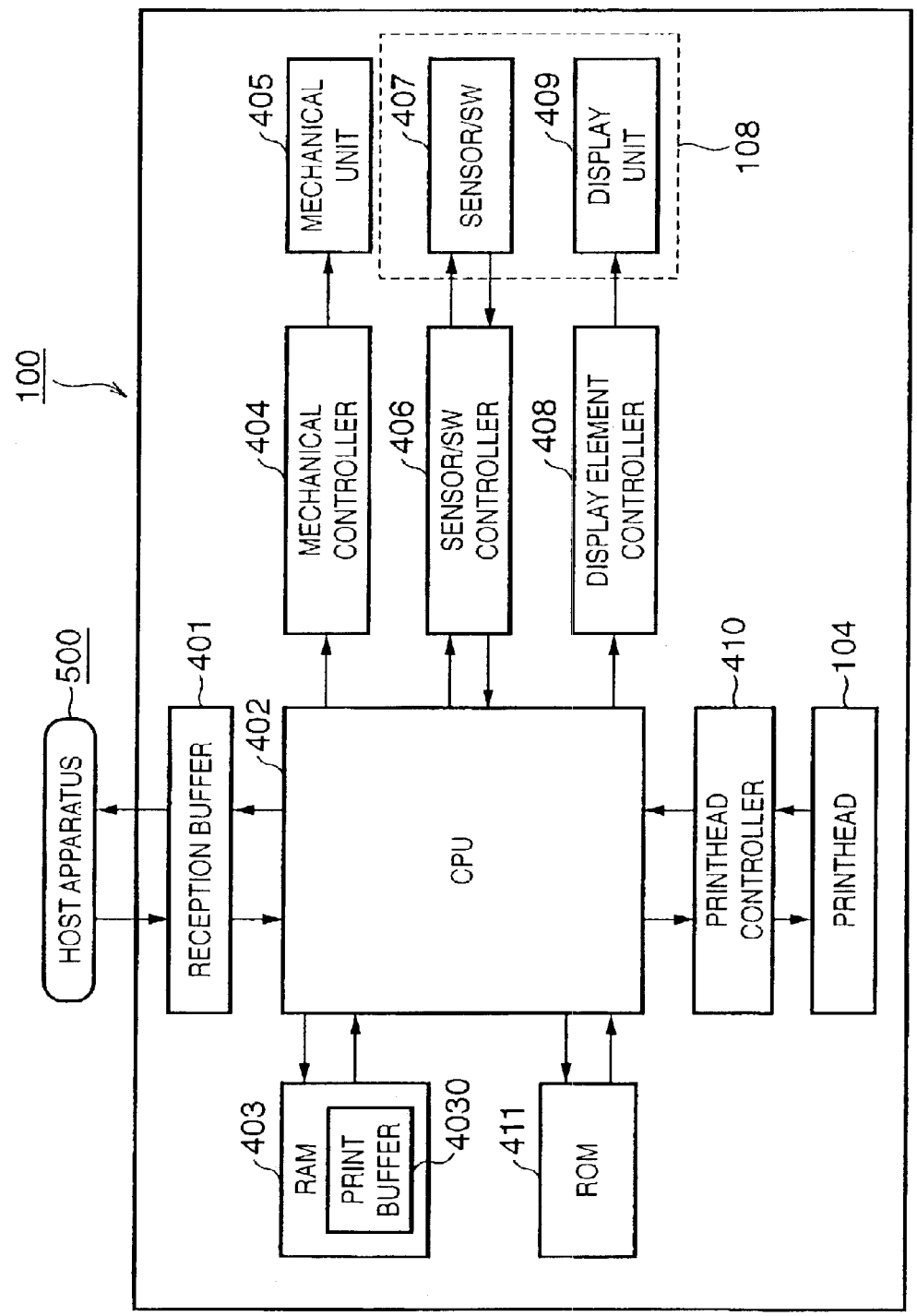
FIG. 3 is a block diagram showing the main arrangement of the inkjet printing apparatus to which the present invention can be applied.

FIG. 3 is a block diagram showing the main arrangement of the inkjet printing apparatus to which the present invention can be applied.

An external host apparatus 500 is connected to the printing apparatus 100. Print data (e.g., data containing character data, image data, and control data) is transmitted from the host apparatus 500 to the printing apparatus 100, and stored in a reception buffer 401. Verify data for verifying whether print data is correctly transferred, and status data representing the operation status of the printing apparatus 100 are transmitted from the printing apparatus 100 to the host apparatus 500.

Note that the host apparatus 500 and printing apparatus 100 are connected by, e.g., a USB interface.

Print data stored in the reception buffer 401 is processed into data for printing in main scanning of the printhead 104 under the control of a CPU 402. The resultant data is stored in a print buffer 4030 within a random access memory (RAM) 403. The print buffer 4030 stores data used for printing by the printhead 104. Data stored in the print buffer 4030 is transferred to the printhead 104, and then printing is executed.

In the example shown in FIG. 3, an area for the print buffer 4030 is ensured in the memory area of the RAM 403. Data in the print buffer 4030 is transferred to the printhead 104 by a printhead controller 410. The printhead 104 is controlled to print character data or image data. The printhead controller 410 detects temperature information or the like representing the state of the printhead 104, and sends the information to the CPU 402. The information is transmitted to the printhead controller 410 which controls driving of the printhead 104.

The mechanical controller 404 drives and controls the mechanical unit 405 such as a carriage motor or line feed motor in response to an instruction from the CPU 402.

A sensor/SW controller 406 transmits a signal to the CPU 402 from a sensor/SW 407 including various sensors and a SW (switch).

A display element controller 408 controls a display unit 409 comprised of LEDs, liquid crystal display elements, and the like for display panels in response to an instruction from the CPU 402.

A ROM 411 stores data such as various control programs and various setting data for executing various control operations of the printing apparatus 100. The CPU 402 appropriately loads various control programs and various setting data into the RAM 403, and executes them, thereby executing various control operations of the printing apparatus 100.

In the present invention, the capacity of the print buffer 4030 is smaller than a memory amount sufficient to store all print data of one main scanning at the maximum printing width by using all the orifices of the printhead 104 necessary for printing.

That is, the capacity of the print buffer 4030 is set smaller than a data amount printed by one main scanning of the printhead 104 by a main scanning/printing width determined depending on the apparatus. This setting can reduce the memory capacity of the RAM 403 in the apparatus.

The host apparatus 500 is implemented by a general-purpose computer such as a personal computer or workstation. The host apparatus 500 has standard building components mounted in a general-purpose computer (e.g., a CPU, RAM, ROM, hard disk, external memory, network interface, display, keyboard, and mouse). The building components are not limited to them, and any building components can be adopted as long as they realize the present invention. The building components shown in FIG. 3 may be realized by executing by the CPU a program stored in the internal ROM of the host apparatus 500 or an external memory, or realized by dedicated hardware.

This embodiment assumes the following cases for color printing.

CASE 1: In connection with a high-performance host apparatus, 1-pass printing is performed using 128 orifices for each of Y, M, C, and Bk in the orifices of the printhead 104. In this case, the host apparatus 500 generates print data which uses 128 orifices in one main scanning of the printhead 104.

CASE 2: In connection with a low-performance host apparatus, 1-pass printing is performed using 96 orifices for each of Y, M, C, and Bk in the orifices of the printhead 104. In this case, the host apparatus 500 generates print data which uses 96 orifices in one main scanning of the printhead 104.

In a color printing mode, data is printed in four colors by the entire printing width of 8 inches at a density of 600 dpi. The print buffer capacity of the printing apparatus necessary for a conventional printing method is For CASE 1, 128×4×8×600=2,457,600 bits For CASE 2, 96×4×8×600=1,843,200 bits In the first embodiment, the memory capacity of the print buffer 4030 is 1,572,864 bits for either case, which is smaller than a memory capacity enough to store all print data of one main scanning. In other words, the memory capacity is decreased from that of a conventional print buffer, reducing the system cost.

The print buffer 4030 according to the first embodiment has detailed arrangements A to E.

A: Memory areas are ensured for Y, M, C, and Bk, respectively.

B: Memory areas are ensured in the vertical (sub-scanning) direction and horizontal (main scanning) direction for respective rectangular blocks of printing pixels. The block size is constant commonly to Y, M, C, and Bk in one main scanning.

C: The vertical size (height) of the block can be set by the operation panel 108 or host apparatus 500. The set value is, e.g., an n1 multiple of 8 (n1 is a positive integer). In the first embodiment, e.g., n1=16, and the set value is 8×16=128.

Note that the set value is an n1 multiple of 8 for efficient calculation processing.

D: The horizontal size (width) of the block can be set by the operation panel 108 or host apparatus 500. The set value is, e.g., an n3 multiple of $2^{n2}$ (n2 and n3 are positive integers). In the first embodiment, n2=8, n3=1, and the set value is $2^8 \times 1 = 256$.

Note that the set value is an n3 multiple of $2^{n2}$ for efficient calculation processing.

E: No memory area is ensured for a block having no data in each color in main printing/scanning. Instead, a zero flag is set, and data of this block is processed as null data in printing. This can save the memory capacity of the print buffer 4030.

With the rectangular block arrangement of the print buffer 4030, the print buffer 4030 can be easily managed. In the first embodiment, the block size is common to Y, M, C, and Bk, which also facilitates management of the print buffer 4030.

Alternatively, the block size can be changed and flexibly cope with printing conditions for effective use of the print buffer 4030.

Processing executed by the printing system according to the first embodiment will be explained with reference to FIG. 4.

Figure 4:
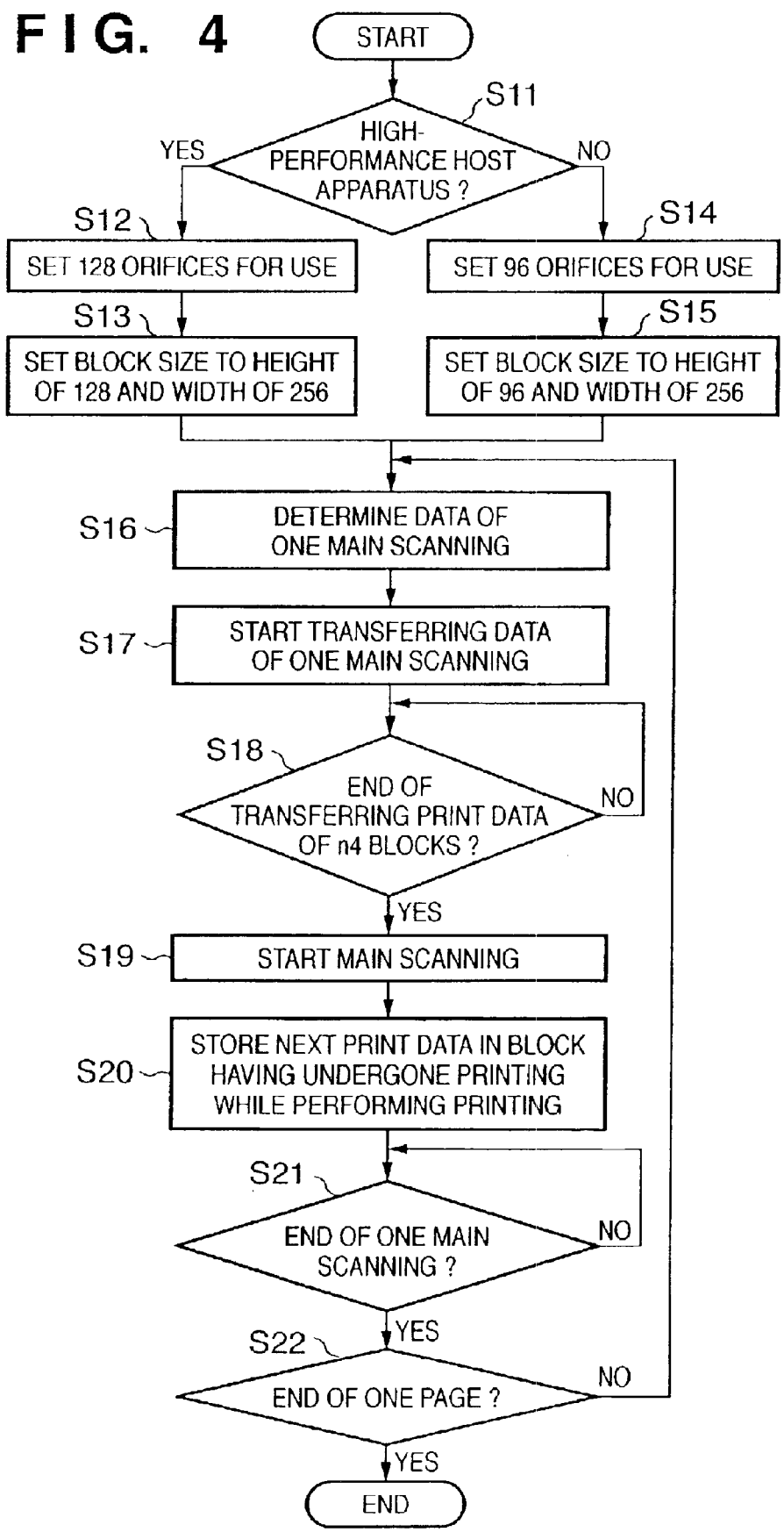
FIG. 4 is a flow chart showing processing executed by a printing system according to the first embodiment.

FIG. 4 is a flow chart showing processing executed by the printing system according to the first embodiment.

In FIG. 4, 1-pass printing of one page of an A4-size color image will be exemplified.

In step S11, whether the host apparatus 500 has high performance is determined.

This determination is done by some of programs of a printer driver running on the host apparatus 500. The host apparatus 500 is a host computer, and, e.g., Windows XP (registered trademark of Microsoft) runs as an OS. If the CPU of the host apparatus 500 is Pentium 2 (registered trademark of Intel), the CPU clock frequency is 300 MHz or higher, and the main memory capacity is 32 Mbytes or more, the host apparatus 500 is determined to have high performance.

If the host apparatus 500 is determined in step S11 to have high performance (YES in step S11), the processing advances to step S12 to set print data generation processing which is performed in the host apparatus 500 in the use of 128 orifices of the printhead 104.

In step S13, the host apparatus 500 sets the block size of the print buffer 4030 of the printing apparatus 100, and transmits block size information to the printing apparatus 100.

The block size can be set in accordance with the performance of the host apparatus 500, the contents (character/image) of print data, or the printing mode for each job, each page, each main scanning, or each block. Since the host apparatus 500 has high performance, the block size is set to a height of 128 and a width of 256.

The number of blocks is set to 12, and the print buffer 4030 in the printing apparatus 100 is set. The memory capacity of the print buffer 4030 is therefore 128×4×256×12=1,572,864 bits. After that, the processing advances to step S16.

If the host apparatus 500 does not have high performance (NO in step S11), the processing advances to step S14 to set print data generation processing which is performed in the host apparatus 500 in the use of 96 orifices of the printhead 104.

In step S15, the host apparatus 500 sets the block size of the print buffer 4030 of the printing apparatus 100, and transmits block size information to the printing apparatus 100.

Since the host apparatus 500 does not have high performance, the block size is set to a height of 96 and a block width of 256. The number of blocks is set to 16, and the print buffer 4030 in the printing apparatus 100 is set. The memory capacity of the print buffer 4030 is therefore 96×4×256×16=1,572,864 bits. Thereafter, the processing advances to step S16.

In step S16, the host apparatus 500 crates print data by one main scanning of the printhead 104. Print data is created as binary data obtained by performing proper image processing for character data or image data to be printed, and determining whether to discharge ink droplets for all Y, M, C, and Bk colors. The binary data is assigned and determined as print data for the next main scanning.

In this fashion, most of data processing concerning printing is performed by the host apparatus 500. The processing burden on the printing apparatus 100 can be reduced, and the ROM capacity for storing control programs and the number of gates of an ASIC can be reduced.

The printing mode of the printing apparatus 100 is a 1-pass printing mode among a plurality of printing modes, and is not changed within each page. The number of orifices used for one main scanning is constant within the page. The block size setting is also constant within the page. The RAM 403 is prepared in advance as a memory capacity capable of ensuring the block size of the print buffer 4030 and the number of blocks.

In step S17, transfer of print data of one main scanning starts from the host apparatus 500 to the printing apparatus 100. At this time, a block having no print data does not ensure any memory area of the print buffer 4030.

In step S18, whether print data have been transferred by the number n4 (integer of 1 or more) of printing start blocks where main scanning starts is determined. If no print data have been transferred (NO in step S18), the processing waits until print data are transferred. If print data have been transferred (YES in step S18), the processing advances to step S19.

In the first embodiment, n4 is 11 for a high-performance host apparatus 500, and 15 for a low-performance host apparatus 500. In this case, n4 is a number equal to or smaller than the number of securable blocks that is obtained from the memory capacity and block size of the RAM 403 of the printing apparatus 100.

In step S19, the carriage 101 of the printing apparatus 100 starts operating, and printing operation of one main scanning starts. At this time, all print data of blocks which do not ensure any memory area are determined as no print data, and null data are transferred to the printhead 104.

In step S20, the printing apparatus 100 stores the next print data in a block having undergone printing while executing printing operation.

In step S21, whether printing by one main scanning of the printhead 104 has ended is determined. If printing by one main scanning has not ended (NO in step S21), the processing waits until the end of printing by one main scanning. If printing by one main scanning has ended (YES in step S21), the processing advances to step S22.

In step S22, whether printing of one page has ended is determined. If printing of one page has not ended (NO in step S22), the processing returns to step S16 until printing of one page ends, and printing by each main scanning is repetitively executed. If printing of one page has ended (YES in step S22), the processing ends.

Arrangements of a block set in the print buffer 4030 according to the first embodiment will be explained with reference to FIGS. 5A and 5B.

Figure 5A:
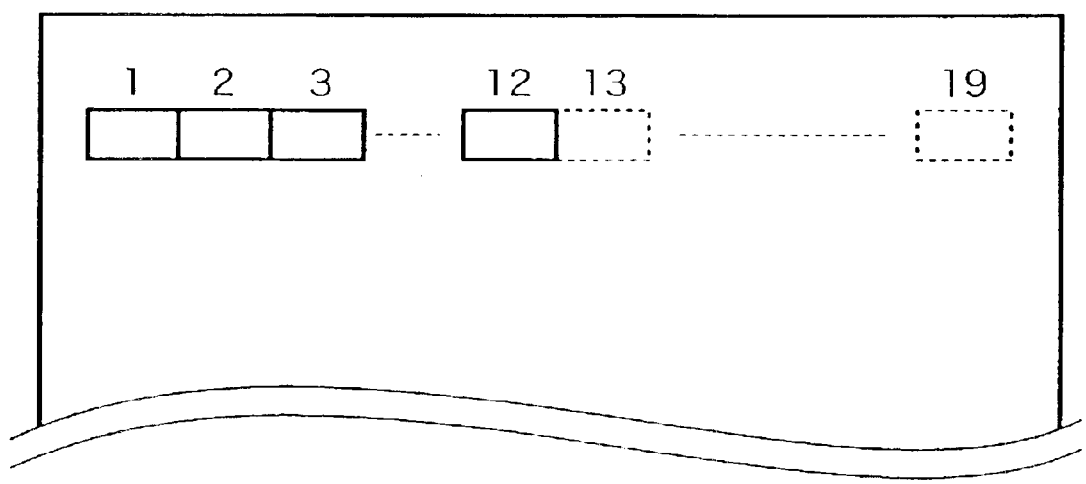
FIG. 5A is a view showing an arrangement of a block set in a print buffer according to the first embodiment.
Figure 5B:
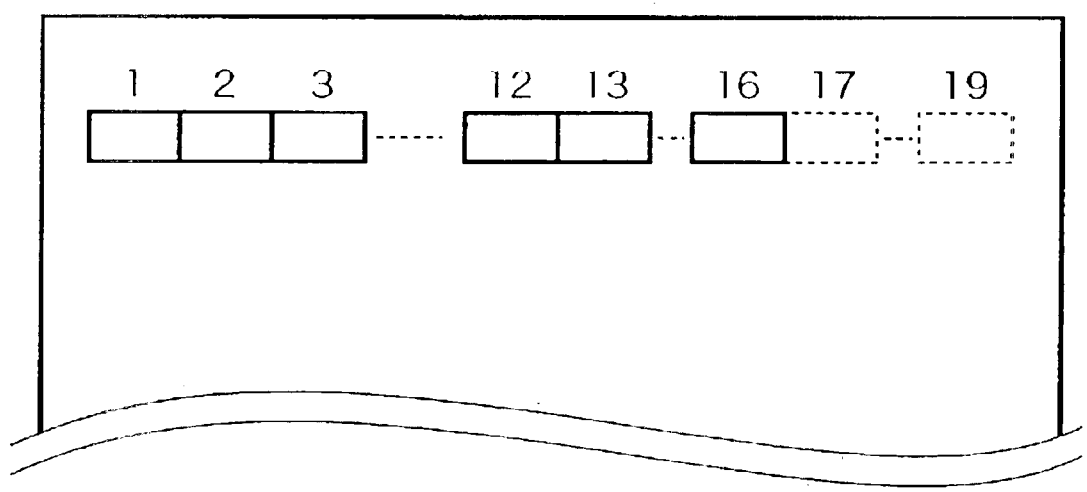
FIG. 5B is a view showing another arrangement of the block set in the print buffer according to the first embodiment.

FIGS. 5A and 5B are views showing arrangements of a block set in the print buffer according to the first embodiment.

FIGS. 5A and 5B are conceptual views showing the block of the print buffer 4030 set when print data corresponding to a width of 8 inches is printed on an A4-size printing medium 105 by one main scanning. In the first embodiment, the resolution in the main scanning direction is 600 dpi. At least 19 blocks (block 1 to block 19) with a width of 256 dots are required for printing of the whole width (4,800 dots) in the main scanning direction.

FIG. 5A shows a block ensured in the print buffer 4030 for a high-performance host apparatus 500. As described above, the block height is 128 dots, the width is 256 dots, and the number of blocks is 12.

FIG. 5B shows a block ensured in the print buffer 4030 for a low-performance host apparatus 500. As described above, the block height is 96 dots, the width is 256 dots, and the number of blocks is 16.

In the case of FIG. 5A, printing operation starts at the start of main scanning, printing of block 1 ends, and the block is then used as block 13. After printing of block 2 ends, the block is used as block 14. Blocks are sequentially used again, and the main scanning ends after the final block 19.

In the case of FIG. 5B, printing operation starts at the start of main scanning, printing of block 1 ends, and the block is then used as block 17. After printing of block 2 ends, the block is used as block 18. Blocks are sequentially used again, and the main scanning ends after the final block 19.

In each of blocks in FIGS. 5A and 5B, a solid line block represents a block which can be ensured as a memory area of the print buffer 4030 at the start of main scanning. A dotted line block represents a block which cannot be ensured as a memory area of the print buffer 4030 at the start of main scanning.

If print data is interrupted during main scanning, i.e., data transfer is left undone, the carriage 101 executes recovery processing of performing the same main scanning again, printing data from the interrupted portion, and thus complementing the data. As for a block having no print data corresponding to a block in each color, no memory area is ensured, and the next block is ensured instead, effectively using the print buffer 4030.

When transfer of print data starts before the host apparatus 500 determines print data of one main scanning, and the printing time is shorter than the time taken to determine and transfer print data, transfer of print data may not catch up with the operation of the carriage 101 during one main scanning.

In this case, interruption of data during printing by one main scanning can be prevented by "starting transfer of print data of one main scanning from the host apparatus 500 to the printing apparatus 100 after the host apparatus 500 determines print data of at least one main scanning".

The first embodiment does not ensure the print buffer 4030 having sufficient capacity to store print data of one main scanning. If the number of orifices used for one main scanning is increased or the driving frequency of the printhead 104 is set high for a low-performance host apparatus 500, print data is readily interrupted during printing by one main scanning. Such data interruption degrades the printing quality, and it is important to minimize interruption.

Note that whether the host apparatus 500 has high performance is determined in step S11 of FIG. 4 on the basis of the type of CPU, the CPU clock frequency, and the main memory capacity. However, the determination is not limited to them.

For example, the determination may be based on the CPU occupation ratio of the use environment of the host apparatus 500 for use to the control of the printing apparatus 100, or the type of OS running on the host apparatus 500. For example, whether the host apparatus 500 has high performance may be determined depending on whether the OS is Windows XP or a more advanced OS. Since the processing speed is low in OSs before Windows XP and high in Windows XP and more advanced OSs, the performance of the host apparatus 500 can be determined.

Further, whether the host apparatus 500 has high performance may be determined on the basis of a combination of the type of CPU of the host apparatus 500, the CPU clock frequency, the main memory capacity, the CPU occupation ratio to the control of the printing apparatus 100, and the type of OS.

In the above description, the performance of the host apparatus is classified into two depending on whether the host apparatus 500 has high performance. Alternatively, the performance may be classified into three or more. In this case, printing control more optimal for the performance of the host apparatus 500 can be realized.

As described above, according to the first embodiment, the print buffer 4030 manages print data for each rectangular block in the main scanning direction and sub-scanning direction. The number of orifices used for one main scanning of the printing apparatus 100 and the block size serving as a data transfer unit (corresponding to a storage unit of the print buffer 4030) from the host apparatus 500 to the printing apparatus 100 are properly changed in accordance with the performance of the host apparatus 500.

The print buffer 4030 with a relatively small memory capacity can be efficiently utilized, and a high-speed, high-quality printing apparatus identical to a conventional one can be implemented. Since the memory capacity of the print buffer 4030 can be reduced, a lower-cost printing apparatus can be provided.

(Second Embodiment)

In the first embodiment, the number of nozzles used for one main scanning of the printing apparatus 100 and the block size serving as a data transfer unit from the host apparatus 500 to the printing apparatus 100 are properly changed in accordance with the performance of the host apparatus 500. However, the present invention is not limited to this. For example, in the second embodiment, the number of nozzles used for one main scanning of a printing apparatus 100 and the block size serving as a data transfer unit from a host apparatus 500 to the printing apparatus 100 are controlled in accordance with the type of interface which connects the host apparatus 500 and printing apparatus 100, or the data transfer rate of the interface.

Note that print data of one scanning can be determined by the data transfer rate because the data transfer rate is roughly determined by the type of interface in use.

The types of interface include USB, IEEE 1394, IEEE 1284 (Centronics), IrDA, Bluetooth, or the like. There is also available another interface which can also transfer data by connecting the host apparatus 500 and printing apparatus 100 by wire or wirelessly.

For example, when the data transfer rate of the interface is low, data transfer may not catch up with printing operation. For a low data transfer rate, the host apparatus 500 generates print data which uses a small number of orifices in one main scanning of the printing apparatus 100. For a high data transfer rate, the host apparatus 500 generates print data which uses a large number of orifices in one main scanning of the printing apparatus 100. This can realize optimal print data transfer and printing control between the host apparatus 500 and the printing apparatus 100.

Processing executed by the printing system according to the second embodiment will be explained with reference to FIG. 6.

Figure 6:
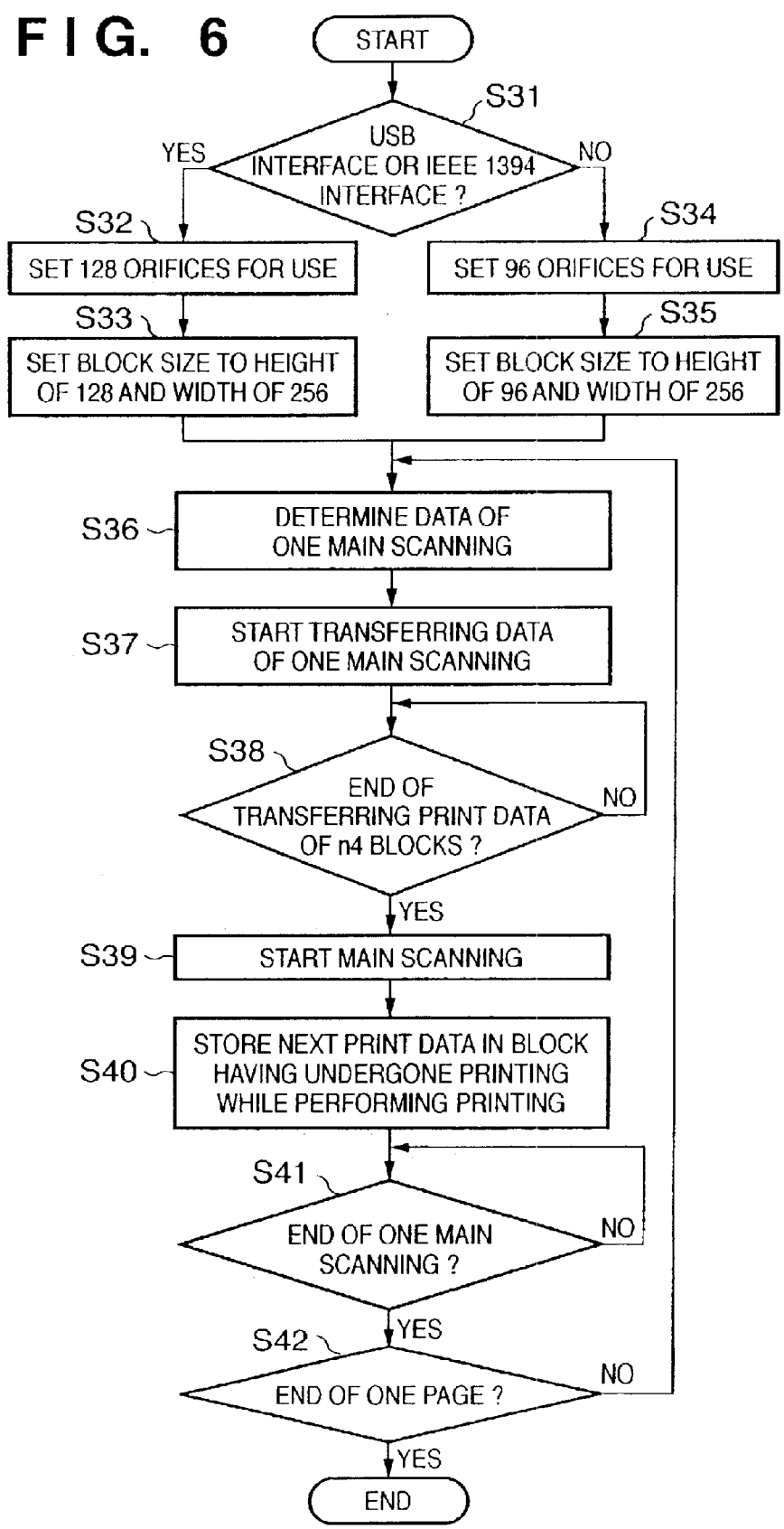
FIG. 6 is a flow chart showing a printing operation executed by a printing apparatus according to the second embodiment.

FIG. 6 is a flow chart showing printing operation executed by the printing apparatus according to the second embodiment.

In step S31, whether the type of interface which connects the host apparatus 500 and printing apparatus 100 is "USB or IEEE 1394" is determined. If the interface is "USB or IEEE 1394" (YES in step S31), the processing advances to step S32. If the interface is not "USB or IEEE 1394" (NO in step S31), the processing advances to step S34.

Processes in steps S32 to S42 correspond to steps S12 to S22 in FIG. 4 in the first embodiment, and a description thereof will be omitted.

Note that the determination in step S31 may be based on not the type of interface but the substantial data transfer rate of an interface in use. In this case, the host apparatus 500 and printing apparatus 100 are equipped with a data transfer rate measuring function (realized by hardware or software), and the data transfer rate is measured prior to normal printing operation. At this time, the data transfer rate of data transfer from the host apparatus 500 to the printing apparatus 100 is measured.

For example, the data transfer rate is measured by measuring the data transfer amount for about 0.1 sec from the host apparatus 500 to the printing apparatus 100. If the data transfer rate is equal to or higher than, e.g., 500 kbits/sec as a result of measurement, the processing advances to step S32, and if the data transfer rate is lower than 500 kbits/sec, to step S34.

The determination in step S31 may be based on a combination of the performance of the host apparatus 500 described in the first embodiment (e.g., the type of CPU, the CPU clock frequency, the main memory capacity, the CPU occupation ratio to the control of the printing apparatus 100, and the type of OS), the type of interface which connects the host apparatus 500 and printing apparatus 100, and the data transfer rate of the interface.

As described above, according to the second embodiment, a print buffer 4030 manages print data for each rectangular block in the main scanning direction and sub-scanning direction. The number of nozzles used for one main scanning of the printing apparatus 100 and the block size serving as a data transfer unit (corresponding to a storage unit of the print buffer 4030) from the host apparatus 500 to the printing apparatus 100 are changed in accordance with the type of interface which connects the host apparatus 500 and printing apparatus 100, or the data transfer rate of the interface.

The print buffer 4030 with a relatively small memory capacity can be efficiently utilized, and a high-speed, high-quality printing apparatus identical to a conventional one can be implemented. Since the memory capacity of the print buffer 4030 can be reduced, a lower-cost printing apparatus can be provided.

(Third Embodiment)

In the first and second embodiments, the number of orifices used for one main scanning of the printing apparatus 100 is controlled in accordance with the performance of the printing system (performance of the host apparatus 500, the type of interface which connects the host apparatus 500 and printing apparatus 100, or the data transfer rate of the interface). However, the present invention is not limited to this. For example, the driving frequency of the printhead 104, i.e., the printing speed, may be controlled in accordance with the performance of the printing system.

The performance of the printing system is determined on the basis of the performance of the host apparatus 500 and the type and data transfer rate of an interface which connects the host apparatus 500 and printing apparatus 100, which have been described in the first and second embodiments.

In the third embodiment, a high-performance printing system has a high processing speed for the overall printing system, and a printhead 104 is driven by setting its driving frequency high. A low-performance printing system does not have a high processing speed for the whole system, and the printhead 104 is driven by setting its driving frequency low.

More specifically, the driving frequency of the printhead 104 is set to 15 kHz in the high-performance printing system, and 10 kHz in the low-performance printing system. A host apparatus 500 transmits, to a printing apparatus 100, driving frequency information for driving the printhead 104 by the printing apparatus 100. The printing apparatus 100 controls printing based on print data transferred from the host apparatus 500 at a driving frequency designated by the received driving frequency information.

In this case, driving frequency information of the printhead 104 is transmitted to the printing apparatus 100 to control the driving frequency of the printhead 104. Alternatively, main scanning speed information for controlling the main scanning speed of the printhead 104 may be transmitted to the printing apparatus 100 to control the main scanning speed of the printhead 104 (i.e., the scanning speed of a carriage 101). Alternatively, both driving frequency information and main scanning speed information, i.e., main scanning/printing speed information for controlling the printing speed in the main scanning direction, may be transmitted to the printing apparatus 100 to control the printing speed of the printhead 104 in the main scanning direction.

Alternatively, the first embodiment (or second embodiment) and the third embodiment may be combined to control printing of the whole printing system.

More specifically, in the high-performance printing system, the number of orifices of the printhead 104 used for printing by one scanning is set to 128, and the driving frequency is set to 15 kHz. In the low-performance printing system, the number of orifices of the printhead 104 used for printing by one scanning is set to 96, and the driving frequency is set to 10 kHz.

As described above, according to the third embodiment, the driving frequency of the printhead 104 used for printing by the printing apparatus 100 is controlled in accordance with the performance of the printing system. A printing environment optimal for the printing system can be realized.

(Fourth Embodiment)

Control of the number of nozzles used by a printhead 104 for printing of one scanning and the driving frequency, which has been described in the above embodiment, may be changed in correspondence with each of a plurality of types of printing modes. A printing mode used for printing is determined by some of printer driver programs running within a host apparatus 500.

For example, the printing mode includes two modes: a high-speed printing mode in which priority is given to high-speed printing for a relatively simple image such as a text or graph; and a high-quality printing mode in which priority is given to high-quality printing for a relatively complicated image such as a photographic image. The number of nozzles used by the printhead 104 is set large in the high-speed printing mode, and small in the high-quality printing mode. Alternatively, the driving frequency of the printhead is set high in the high-speed printing mode, and low in the high-quality printing mode.

This arrangement is based on the fact that the printing speed is not important in the high-quality printing mode, printing takes a long time, ink is satisfactorily permeated and fixed into a printing medium, and a high image quality can be obtained.

As described above, according to the fourth embodiment, the number of ink orifices of the printhead 104 used for printing by a printing apparatus 100 is controlled in accordance with the printing mode. A printing environment optimal for the printing system can be realized.

(Fifth Embodiment)

As an application of controlling the driving frequency of a printhead 104, the driving frequency of the printhead 104 may be decreased upon a decrease in the data transfer rate from a host apparatus 500 to a printing apparatus 100 during main scanning/printing operation.

In this case, at least one of the host apparatus 500 and printing apparatus 100 has a data transfer rate monitoring function (realized by hardware or software). A high driving frequency of, e.g., 15 kHz is generally used, and when the data transfer rate decreases, the driving frequency of the printhead 104 is decreased. However, an abrupt decrease in driving frequency influences the characteristics of the printhead 104 and the ink landing precision. It is therefore desirable to gradually decrease the driving frequency.

As described above, according to the fifth embodiment, the data transfer rate may excessively decrease during main scanning owing to multitask processing realized by the host apparatus 500, and print data may be interrupted, failing in printing even by scanning the carriage 101. This situation can be prevented by properly decreasing the driving frequency of the printhead 104 in accordance with the decreased data transfer rate.

The above embodiments have been explained by assuming that a droplet discharged from a printhead is ink and a liquid contained in an ink tank is ink. However, the content of the ink tank is not limited to ink. For example, the ink tank may contain a processing solution to be discharged onto a printing medium to increase the fixing properties, water resistance, or quality of a printed image.

The above embodiments can increase the density and resolution of printing by using a system which includes a means (e.g., an electrothermal transducer or laser beam) for generating heat energy as energy used to discharge ink and causes a state change of the ink by this heat energy, among other inkjet printing systems. The printhead is not limited to this system, and may discharge ink by using a piezoelectric element.

As a representative arrangement or principle, it is preferable to use the basic principle disclosed in, e.g., U.S. Pat. No. 4,723,129 or 4,740,796. This system is applicable to both a so-called on-demand apparatus and continuous apparatus. The system is particularly effective in an on-demand apparatus because at least one driving signal, which corresponds to printing information and gives a rapid temperature rise exceeding nucleate boiling, is applied to an electrothermal transducer which corresponds to a sheet or channel holding a liquid (ink), thereby causing this electrothermal transducer to generate heat energy and cause film boiling on the thermal action surface of a printhead, and consequently a bubble can be formed in the liquid (ink) in one-to-one correspondence with the driving signal.

By growth and shrinkage of this bubble, the liquid (ink) is discharged from an orifice to form at least one droplet. This driving signal is more preferably a pulse signal because growth and shrinkage of a bubble are instantaneously appropriately performed, so discharge of the liquid (ink) having high response is achieved.

This pulse driving signal is preferably a signal described in U.S. Pat. No. 4,463,359 or 4,345,262. Note that superior printing can be performed by the use of conditions described in U.S. Pat. No. 4,313,124, which concerns the rate of temperature rise on the thermal action surface.

The arrangement of a printhead can be a combination (a linear liquid channel or a right-angle liquid channel) of orifices, liquid channels, and electrothermal transducers disclosed in the specifications described above. The present invention also includes arrangements using U.S. Pat. Nos. 4,558,333 and 4,459,600, in each of which the thermal action surface is placed in a bent region. Additionally, it is possible to use an arrangement based on Japanese Patent Laid-Open No. 59-123670 in which a common slot is used as a discharge portion of a plurality of electrothermal transducers or Japanese Patent Laid-Open No. 59-138461 in which an opening for absorbing the pressure wave of heat energy is opposed to a discharge portion.

Furthermore, a full line type printhead having a length corresponding to the width of the largest printing medium printable by a printing apparatus can have a structure which meets this length by combining a plurality of printheads as disclosed in the aforementioned specifications or can be a single integrated printhead.

In addition, it is possible to use not only a cartridge type printhead, explained in the above embodiments, in which ink tanks are integrated with a printhead itself, but also an interchangeable chip type printhead which can be electrically connected to an apparatus main body and supplied with ink from the apparatus main body when attached to the apparatus main body.

Adding a recovering means or a preliminary means for a printhead to the printing apparatus described above is preferable because printing operation can further stabilize. Practical examples of the additional means for a printhead are a capping means, a cleaning means, a pressurizing or drawing means, and an electrothermal transducer or another heating element or a preliminary heating means combining them. A predischarge mode for performing discharge different from printing is also effective to perform stable printing.

A printing mode of the printing apparatus is not restricted to a printing mode using only a main color such as black. That is, the apparatus can have at least a composite color mode using different colors and a full color mode using mixed colors, regardless of whether a printhead is an integrated head or a combination of a plurality of heads.

The present invention is also achieved by supplying a software program (in the above embodiments, programs corresponding to flow charts shown in the accompanying drawings) for realizing the functions of the above-described embodiments to a system or apparatus directly or from a remote place, and reading out and executing the supplied program codes by the computer of the system or apparatus. In this case, the software need not be a program as long as it has a program function.

The present invention is therefore realized by program codes installed into the computer in order to realize functional processing of the present invention. That is, the present invention includes a computer program for realizing functional processing of the present invention.

In this case, the present invention can take any program form such as an object code, a program executed by an interpreter, or script data supplied to an OS as long as a program function is attained.

A recording medium for supplying the program includes a floppy disk, hard disk, optical disk, magnetooptical disk, MO, CD-ROM, CD-R, CD-RW, magnetic tape, nonvolatile memory card, ROM, and DVD (DVD-ROM and DVD-R).

As another program supply method, the program can be supplied by connecting a client computer to an Internet homepage via the browser of the client computer, and downloading the computer program of the present invention or a compressed file containing an automatic installing function from the homepage to a recording medium such as a hard disk. The program can also be supplied by classifying program codes which constitute the program of the present invention into a plurality of files, and downloading the files from different homepages. That is, the present invention also contains a WWW server which allows a plurality of users to download the program files for realizing functional processing of the present invention by a computer.

The present invention can also be realized by the following method. That is, the program of the present invention is encrypted, stored in a storage medium such as a CD-ROM, and distributed to the user. A user who satisfies predetermined conditions is caused to download decryption key information from a homepage via the Internet. The user executes the encrypted program by using the key information, and installs the program in the computer.

The functions of the above-described embodiments are realized when the computer executes a readout program. Also, the functions of the above-described embodiments are realized when an OS or the like running on a computer performs part or all of actual processing on the basis of the instructions of the program codes.

The functions of the above-described embodiments are also realized when a program read out from a storage medium is written in the memory of a function expansion board inserted into a computer or the memory of a function expansion unit connected to the computer, and the CPU of the function expansion board or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus which performs printing by driving a printhead on the basis of print data transmitted from a host apparatus, comprising:

main scanning means for scanning the printhead in a main scanning direction with respect to a printing medium;

buffer means for storing print data in blocks;

reception means for receiving block size information of a block which is generated on the basis of performance of the host apparatus and serves as a storage unit in said buffer means;

storage means for storing print data generated on the basis of the performance of the host apparatus in said buffer means for each block corresponding to the block size information received by said reception means; and control means for controlling printing by the printhead on the basis of the print data stored in said buffer means.

2. The apparatus according to claim 1, wherein said storage means stores print data of each block during scanning of the printhead by said main scanning means, and a data amount which can be stored in said buffer means is smaller than a print data amount corresponding to a region printable by one main scanning of the printhead.

3. The apparatus according to claim 1, wherein the print data generated on the basis of the performance of the host apparatus includes print data corresponding to a number of orifices used for one main scanning of the printhead.

4. The apparatus according to claim 1, wherein the performance of the host apparatus includes at least one or a combination of a type of CPU of the host apparatus, a clock frequency of the CPU, a main memory capacity, a CPU occupation ratio to control of the printing apparatus, a type of OS, and an interface or a data transfer rate between the host apparatus and the printing apparatus.

5. The apparatus according to claim 1, wherein said reception means receives, from the host apparatus, main scanning/printing speed information for controlling a printing speed of the printhead in the main scanning direction, and said control means controls printing by the printhead on the basis of the main scanning/printing speed information and the print data stored in said buffer means.

6. A printing apparatus which performs printing by driving a printhead on the basis of print data transmitted from a host apparatus, comprising:

main scanning means for scanning the printhead in a main scanning direction with respect to a printing medium;

buffer means for storing print data in blocks;

reception means for receiving block size information of a block which is generated on the basis of a printing mode set by the host apparatus and serves as a storage unit in said buffer means;

storage means for storing print data generated on the basis of the printing mode set by the host apparatus in said buffer means for each block corresponding to the block size information received by said reception means; and control means for controlling printing by the printhead on the basis of the print data stored in said buffer means.

7. The apparatus according to claim 6, wherein said storage means stores print data of each block during scanning of the printhead by said main scanning means, and a data amount which can be stored in said buffer means is smaller than a print data amount corresponding to a region printable by one main scanning of the printhead.

8. The apparatus according to claim 6, wherein the print data generated on the basis of the printing mode set by the host apparatus includes print data corresponding to a number of orifices used for one main scanning of the printhead.

9. An information processing apparatus which transmits print data to a printing apparatus that has a buffer for storing print data in blocks and performs printing by scanning a printhead in a main scanning direction with respect to a printing medium on the basis of the print data stored in the buffer, comprising:

first transmission means for generating block size information of a block serving as a storage unit in the buffer on the basis of performance of the information processing apparatus, and transmitting the block size information to the printing apparatus;

generation means for generating print data on the basis of the performance of the information processing apparatus; and second transmission means for transmitting the print data generated by said generation means to the printing apparatus.

10. The apparatus according to claim 9, wherein the print data generated by said generation means includes print data which is determined in accordance with the performance of the information processing apparatus and corresponds to a number of orifices used for one main scanning of the printhead.

11. The apparatus according to claim 9, wherein the performance includes at least one or a combination of a type of CPU of the information processing apparatus, a clock frequency of the CPU, a main memory capacity, a CPU occupation ratio to control of the printing apparatus, a type of OS, and an interface or a data transfer rate between the information processing apparatus and the printing apparatus.

12. An information processing apparatus which transmits print data to a printing apparatus that has a buffer for storing print data in blocks and performs printing by scanning a printhead in a main scanning direction with respect to a printing medium on the basis of the print data stored in the buffer, comprising:

first transmission means for generating block size information of a block serving as a storage unit in the buffer on the basis of a printing mode of the printing apparatus set by the information processing apparatus, and transmitting the block size information to the printing apparatus;

generation means for generating print data on the basis of the printing mode of the printing apparatus set by the information processing apparatus; and second transmission means for transmitting the print data generated by said generation means to the printing apparatus.

13. The apparatus according to claim 12, wherein the print data generated by said generation means includes print data which is determined in accordance with the printing mode of the printing apparatus and corresponds to a number of orifices used for one main scanning of the printhead.

14. A method of controlling a printing apparatus which has a buffer for storing print data in blocks and performs printing by driving a printhead on the basis of print data from a host apparatus that is stored in the buffer, comprising:

a reception step of receiving block size information of a block which is generated on the basis of performance of the host apparatus and serves as a storage unit in the buffer;

a storage step of storing print data generated on the basis of the performance of the host apparatus in the buffer for each block corresponding to the block size information received in the reception step; and a control step of controlling printing by the printhead on the basis of the print data stored in the buffer.

15. A method of controlling a printing apparatus which has a buffer for storing print data in blocks and performs printing by driving a printhead on the basis of print data from a host apparatus that is stored in the buffer, comprising:

a reception step of receiving block size information of a block which is generated on the basis of a printing mode of the host apparatus and serves as a storage unit in the buffer;

a storage step of storing print data generated on the basis of the printing mode set by the host apparatus in the buffer for each block corresponding to the block size information received in the reception step; and a control step of controlling printing by the printhead on the basis of the print data stored in the buffer.

16. A method of controlling an information processing apparatus which transmits print data to a printing apparatus that has a buffer for storing print data in blocks and performs printing by scanning a printhead in a main scanning direction with respect to a printing medium on the basis of the print data stored in the buffer, comprising:

a first transmission step of generating block size information of a block serving as a storage unit in the buffer on the basis of performance of the information processing apparatus, and transmitting the block size information to the printing apparatus;

a generation step of generating print data on the basis of the performance of the information processing apparatus; and a second transmission step of transmitting the print data generated in the generation step to the printing apparatus.

17. A method of controlling an information processing apparatus which transmits print data to a printing apparatus that has a buffer for storing print data in blocks and performs printing by scanning a printhead in a main scanning direction with respect to a printing medium on the basis of the print data stored in the buffer, comprising:

a first transmission step of generating block size information of a block serving as a storage unit in the buffer on the basis of a printing mode of the printing apparatus set by the information processing apparatus, and transmitting the block size information to the printing apparatus;

a generation step of generating print data on the basis of the printing mode of the printing apparatus set by the information processing apparatus; and a second transmission step of transmitting the print data generated in the generation step to the printing apparatus.

18. A program of causing a computer to control a printing apparatus which has a buffer for storing print data in blocks and performs printing by driving a printhead on the basis of print data from a host apparatus that is stored in the buffer, comprising:

a program code for a reception step of receiving block size information of a block which is generated on the basis of performance of the host apparatus and serves as a storage unit in the buffer;

a program code for a storage step of storing print data generated on the basis of the performance of the host apparatus in the buffer for each block corresponding to the block size information received in the reception step; and a program code for a control step of controlling printing by the printhead on the basis of the print data stored in the buffer.

19. A program of causing a computer to control a printing apparatus which has a buffer for storing print data in blocks and performs printing by driving a printhead on the basis of print data from a host apparatus that is stored in the buffer, comprising:

a program code for a reception step of receiving block size information of a block which is generated on the basis of a printing mode of the host apparatus and serves as a storage unit in the buffer;

a program code for a storage step of storing print data generated on the basis of the printing mode set by the host apparatus in the buffer for each block corresponding to the block size information received in the reception step; and a program code for a control step of controlling printing by the printhead on the basis of the print data stored in the buffer.

20. A program of causing a computer to control an information processing apparatus which transmits print data to a printing apparatus that has a buffer for storing print data in blocks and performs printing by scanning a printhead in a main scanning direction with respect to a printing medium on the basis of the print data stored in the buffer, comprising:

a program code for a first transmission step of generating block size information of a block serving as a storage unit in the buffer on the basis of performance of the information processing apparatus, and transmitting the block size information to the printing apparatus;

a program code for a generation step of generating print data on the basis of the performance of the information processing apparatus; and a program code for a second transmission step of transmitting the print data generated in the generation step to the printing apparatus.

21. A program of causing a computer to control an information processing apparatus which transmits print data to a printing apparatus that has a buffer for storing print data in blocks and performs printing by scanning a printhead in a main scanning direction with respect to a printing medium on the basis of the print data stored in the buffer, comprising:

a program code for a first transmission step of generating block size information of a block serving as a storage unit in the buffer on the basis of a printing mode of the printing apparatus set by the information processing apparatus, and transmitting the block size information to the printing apparatus;

a program code for a generation step of generating print data on the basis of the printing mode of the printing apparatus set by the information processing apparatus; and a program code for a second transmission step of transmitting the print data generated in the generation step to the printing apparatus.

* * * * *